(12) United States Patent
Mazaki et al.

(10) Patent No.: US 7,131,795 B2
(45) Date of Patent: Nov. 7, 2006

(54) TOOL DEVICE, AND METHOD FOR DRILLING

(75) Inventors: Shigeru Mazaki, Tokyo (JP); Isamu Nagai, Yokohama (JP)

(73) Assignees: Mitsubishi Materials Corporation, Tokyo (JP); Nippon Diamond Co., Ltd., Yokohama (JP)

( * ) Notice: Subject to any disclaimer, the term of this patent is extended or adjusted under 35 U.S.C. 154(b) by 0 days.

(21) Appl. No.: 10/482,534

(22) PCT Filed: Jun. 28, 2002

(86) PCT No.: PCT/JP02/06556

§ 371 (c)(1),
(2), (4) Date: Dec. 23, 2003

(87) PCT Pub. No.: WO03/002320

PCT Pub. Date: Jan. 9, 2003

(65) Prior Publication Data

US 2004/0191010 A1 Sep. 30, 2004

(30) Foreign Application Priority Data

Jun. 29, 2001 (JP) .............................. 2001-199507

(51) Int. Cl.
 B23B 51/00 (2006.01)
(52) U.S. Cl. ....................................... 408/1 R; 408/59
(58) Field of Classification Search ................ 408/1 R, 408/59, 57, 56, 67, 227, 230; 175/71, 233, 175/323, 329; 125/23.01

See application file for complete search history.

(56) References Cited

U.S. PATENT DOCUMENTS

| 4,036,308 | A | | 7/1977 | Dellenberg | |
|---|---|---|---|---|---|
| 4,711,609 | A | | 12/1987 | Seefluth | |
| 4,805,705 | A | * | 2/1989 | Liljebrand et al. | ............ 173/80 |
| 4,854,788 | A | * | 8/1989 | Okinaga | ....................... 408/59 |
| 5,378,091 | A | * | 1/1995 | Nakamura | .................. 409/132 |
| 5,490,571 | A | * | 2/1996 | Hanns et al. | ................ 175/323 |
| 5,584,352 | A | * | 12/1996 | Beavers | ....................... 175/71 |
| 5,980,166 | A | * | 11/1999 | Ogura | .......................... 408/57 |
| 6,161,633 | A | * | 12/2000 | Broom | ........................ 175/320 |
| 6,602,031 | B1 | * | 8/2003 | Hara | ........................... 409/131 |
| 6,648,561 | B1 | * | 11/2003 | Kraemer | ...................... 408/57 |
| 2003/0007835 | A1 | * | 1/2003 | Jurshak | ........................ 404/72 |
| 2003/0026666 | A1 | * | 2/2003 | Toublanc | ...................... 408/59 |

FOREIGN PATENT DOCUMENTS

| BE | 852 189 A1 | 7/1977 |
|---|---|---|
| JP | 58-217208 A | 12/1983 |

(Continued)

OTHER PUBLICATIONS

Supplementary European Search Report completed Jun. 22, 2006 for EP 02 74 3757.

(Continued)

Primary Examiner—Monica Carter
Assistant Examiner—J Williams
(74) Attorney, Agent, or Firm—Darby & Darby

(57) ABSTRACT

A tool, a device, and a method for drilling capable of very easily forming a hole part in a drilled matter by extremely smoothly discharging chips produced at drilled positions so as to maintain an excellent drilling efficiency. By using a drilling tool having a shaft with a spiral groove part formed in the outer peripheral surface thereof and a bit fixed to the tip part of the shaft, the hole part is formed in a drilled matter by rotating the shaft.

17 Claims, 5 Drawing Sheets

FOREIGN PATENT DOCUMENTS

| JP | 61-146412 A1 | 7/1986 |
| JP | 61-148607 A1 | 9/1986 |
| JP | 2-3805 A1 | 1/1990 |
| JP | 05039696 A * | 2/1993 |
| JP | 8-238617 A1 | 9/1996 |
| JP | 11-10425 A | 1/1999 |
| JP | 2002-67027 A1 | 3/2002 |
| JP | 2002-120219 A1 | 4/2002 |

OTHER PUBLICATIONS

Patent Abstracts of Japan for JP11-010425 published Jan. 19, 1999.
Patent Abstracts of Japan for JP58-217208 published Dec. 17, 1983.

* cited by examiner

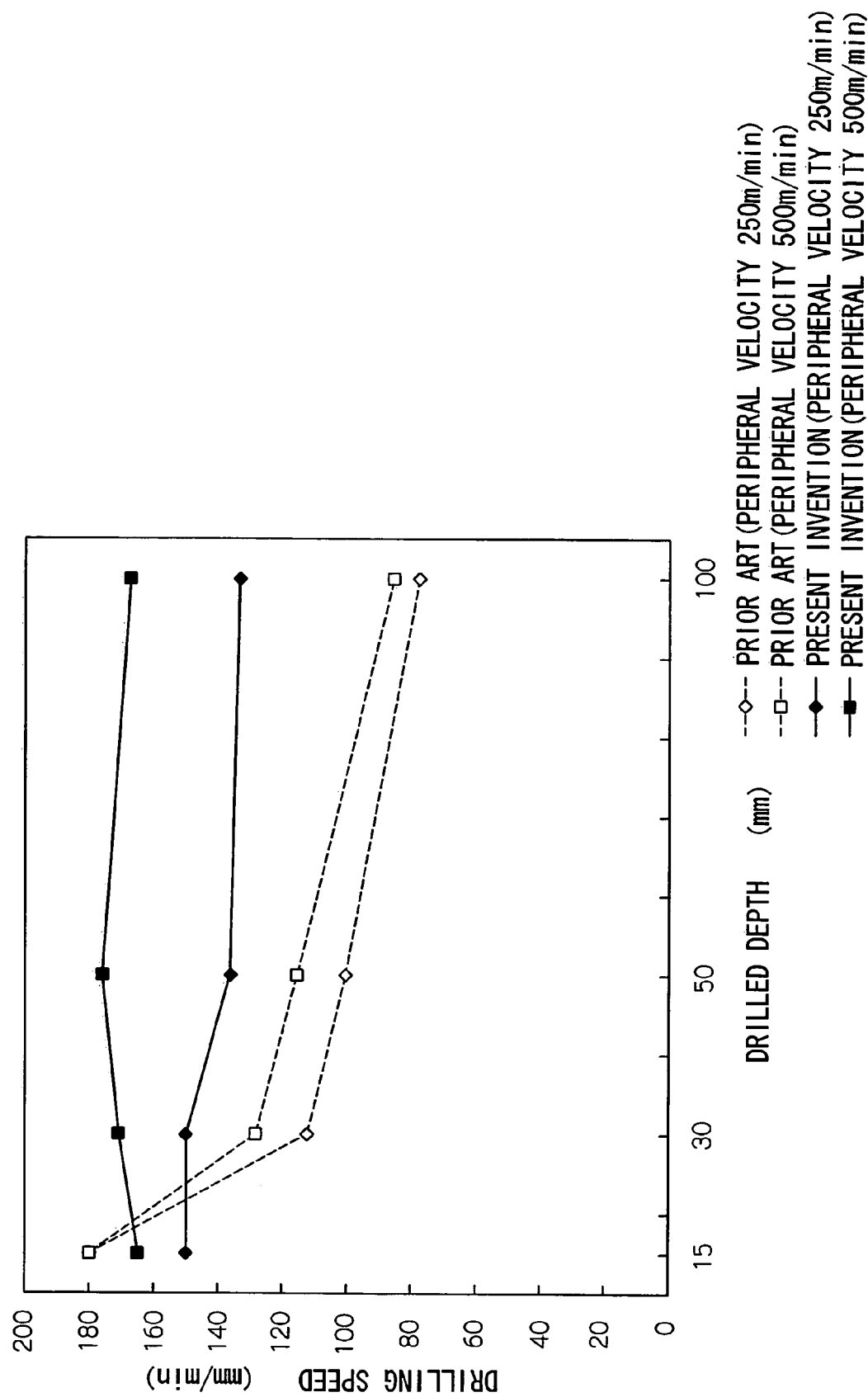

TOOL DEVICE, AND METHOD FOR DRILLING

This is a U.S. national phase application under 35 U.S.C. §371 of International Patent Application No. PCT/JP2002/06556 filed Jun. 28, 2002 and claims the benefit of Japanese Application No. 2001-199507, filed Jun. 29, 2001. The International Application was published in Japanese on Jan. 9, 2003 as International Publication No. WO/2003/002320 under PCT Article 21(2). Both applications are incorporated herein by reference.

TECHNICAL FIELD

The present invention relates to a tool, a device, and a method for drilling, for example, a concrete.

BACKGROUND ART

Recently, measures have been taken to prevent falling of wall tiles from old buildings. In a method used for achieving such a purpose, for example, a hole is formed in a tile or tile joint to a depth reaching to a base concrete, and a resin is introduced through the hole so that the tile is fixed from the back.

In order to form a hole in a concrete, a hammer drill or vibrating drill which forms a hole in a drilled matter by rotating a super-hard drill so as to generate vibration or apply impact force is conventionally used. However, the drilling operation using a hammer drill or a vibration drill has a disadvantage in that a large mechanical sound is generated and vibration or noise associated with the operation is transmitted to the entire building. Thus, not only are the neighbors disturbed by the noise, but also falling of tiles is accelerated and the building may be further damaged.

In order to solve the above problems, a drilling tool of small diameter (3–15 mm) having a disc shaped bit at the tip of a rod-shaped or cylindrical shaft, and a drilling device, such as a handheld drill, including a rotation-driving device which rotates and drives the drilling tool around its axis may sometimes be used. As the bit of the drilling device, one in which super-grains are dispersed in a binder phase or one which is formed using a super-hard alloy is employed. Since the bit is rotated at a high-speed while it is pressed against a drilled matter so that a hole is formed with the generation of fine powder chips, the noise generated by the drilling device is less compared to that generated by a hammer drill or a vibration drill, and it becomes possible to carry out the drilling operation without causing vibration to the drilled matter.

In the above drilling device, although the chips are discharged by passing through a space between the surface of the wall being formed and the bit or the shaft, the fine powder chips tend to stay in the hole and are hardly removed as the depth of the hole increases. For a case where a liquid is introduced into the hole to facilitate the discharge of chips, it becomes difficult to smoothly supply and discharge the liquid for the same reason. If the chips remain at the bottom of the hole, the bit cannot reach the drilled matter and the drilling process cannot be performed. Also, when a hole is formed to a certain depth, no chips may be discharged and the bit cannot be advanced any further. Accordingly, it is difficult to form a deep hole of small diameter.

Moreover, the chips may stay not only at the tip of a blade (bottom of the hole) but also around the drilling tool (side surface of the hole), breaking the tool and decreasing the number of rations thereof. This causes a decrease in drilling efficiency, and there is a danger that heat may be generated and a brazed chip may fall.

In order to smoothly discharge the chips at the drilling position, if a shaft is made hollow and a core bit which drills while forming a core center in the hole is used, it becomes possible to decrease the amount of chips generated. Also, it becomes possible to discharge the chips by introducing a fluid, such as water and a gas, from the outside to the drilling position through the hole.

However, in a conventional wet process in which chips are discharged by supplying water, the operation place may be swamped by the water or the dirty water containing fine power chips may be spattered, contaminating the surrounding environment. Thus, a cleaning device may be needed in addition to the drilling device, and hence the use of the conventional process is not preferable.

Also, as for the above-mentioned drilling tool of a small diameter of 3–15 mm, for example, a large amount of chips is generated relative to a hole of small diameter since a core bit cannot be employed with the drilling tool. Also, since the fluid used for discharging the chips can be supplied only through an opening of the drilled hole, it is extremely difficult to discharge the chips generated.

That is, in the conventional drilling device, it is difficult to form a deep hole of small diameter, and not only is the drilling efficiency reduced as the depth of the hole increases, but also a hole having a desired depth may not be formed, depending on the diameter of the hole. Furthermore, since the above drilling device requires not only the drilling tool and the rotation-driving device but also a device for supplying fluid, such as a compressor, there is a problem in that the scale of the overall device is large.

DISCLOSURE OF THE INVENTION

The present invention is achieved in consideration of the above-mentioned problems, and an object of the present invention is to very easily form a hole part in a drilled matter by extremely smoothly discharging chips produced at drilled positions so as to maintain an excellent drilling efficiency In order to achieve the above object, the first embodiment of the present invention provides a drilling device for forming a hole in a brittle drilled matter from which powdery chips are generated, including: a tool having a shaft and a disc shape bit which is fixed to an end portion of the shaft; and a rotation driving device which rotates and drives the tool, wherein a spiral groove part which extends to a tip of the bit is formed in an outer peripheral surface of the shaft of the tool, and the tool is rotated at a peripheral velocity of 250 m/min or more by the rotation driving device.

According to the above embodiment of the invention, the rotation of the bit makes a hole in a drilled matter, and the spiral groove part generates air flow in the hole due to a high-speed rotation of the shaft.

The second embodiment of the present invention provides a drilling device according to the first embodiment, wherein the spiral groove part is provided so as to generate air flow from a tip side of the shaft to a rear end side along the groove part by the rotation of the tool due to obliquity of the spiral groove part extending towards a rear side of a rotation direction by the rotation driving device and towards a rear end side of the shaft.

According to the above embodiment of the invention, air flow which flows from the tip side to the rear end side of the tool is generated by the high-speed rotation of the shaft, and powdery chips present in the hole are discharged outside by the air flow. Accordingly, chips do not remain at a drilled portion to prevent the drilling operation, and a deep hole of small diameter, which is difficult to form using a conventional technique, can be readily formed. Also, since chips are immediately discharged from the drilled portion as the drilling operation proceeds, a device which supplies a fluid to a drilled portion to discharge chips or a structure for supplying a fluid to a drilled portion becomes unnecessary and a simplified and labor saving drilling device may be realized.

The third embodiment of the present invention provides a drilling device according to the first or second embodiment, wherein a hole which pierces though the shaft to reach the tip of the bit is formed in the tool so that a vicinity of the bit communicates with air present at a rear end side of the shaft.

According to the above embodiment of the invention, since air flow which flows in one direction is generated between the inner wall of the hole part and the shaft by the high-speed rotation of the shaft while another air flow which flows in the opposite direction is generated by providing a hole in the tool which makes a drilled portion communicate with air present outside the hole, the flow of air becomes smooth. For example, an intake flow is generated in the hole if a discharge flow is generated between the inner wall of the hole and the shaft due to the high-speed rotation of the shaft. Also, it becomes possible to supply a gas, such as air, liquid, such as water and alcohol, and mist, etc., through the hole, and hence not only chips are efficiently discharged but also the drilled portion can be cooled down.

The fourth embodiment of the present invention provides a drilling device according to the first embodiment, wherein the spiral groove part is provided so as to generate air flow from a rear end of the tool to a tip side of the shaft along the groove part by the rotation of the tool due to obliquity of the spiral groove part extending towards a rear side of a rotation direction by the rotation driving device and towards a tip side of the shaft, and a hole which pierces though the shaft to reach the tip of the bit is formed in the tool so that the tip side of the bit communicates with air present at a rear end side of the shaft.

According to the above embodiment of the invention, since air flow which flows in one direction is generated between the inner wall of the hole and the shaft by the high-speed rotation of the shaft while a discharge flow is generated through a piercing hole formed in the tool which makes a drilled portion communicate with air present outside the hole, the flow of air becomes smooth. Also, it becomes possible to drill a drilled matter while discharging chips through the piercing hole. Accordingly, since the chips can be collected through the piercing hole, it becomes possible to carry out a drilling operation without scattering the chips.

The fifth embodiment of the present invention provides a drilling tool, including: a shaft and a disc shape bit fixed to an end portion of the shaft, wherein a spiral groove part which extends to a tip of the bit is formed in an outer peripheral surface of the shaft, and the tool is rotated at a peripheral velocity of 250 m/min or more to form a hole part in a brittle drilled matter from which powdery chips are generated.

According to the above embodiment of the invention, the rotation of the bit makes a hole in a drilled matter, and the spiral groove part generates air flow in the hole due to a high-speed rotation of the shaft.

The sixth embodiment of the present invention provides drilling tool according to the fifth embodiment, wherein the spiral groove part is provided so as to generate air flow from a tip side of the shaft to a rear end side along the groove part by the rotation of the tool due to obliquity of the spiral groove part extending towards a rear side of a rotation direction and towards a rear end side of the shaft.

According to the above embodiment of the invention, it becomes possible to obtain a drilling tool which generates air flow flowing from the tip to the rear end of the tool by a high-speed rotation thereof. That is, since powdery chips in the hole can be discharged outside by the air flow, and hence the chips do not remain at a drilled portion to prevent the drilling operation, a deep hole of small diameter, which is difficult to form using a conventional technique, can be readily formed.

The seventh embodiment of the present invention provides a drilling tool according to the fifth or sixth embodiment, wherein a hole which pierces though the shaft to reach the tip of the bit is formed so that a vicinity of the bit communicates with air present at a rear end side of the shaft.

According to the above embodiment of the invention, since air flow which flows in one direction is generated between the inner wall of the hole and the shaft by the high-speed rotation of the shaft while another air flow which flows in the opposite direction is generated in the piercing hole, it becomes possible to carry out a drilling operation while smoothly performing discharging and intaking of air. For example, if a discharge flow is generated between the inner wall of the hole and the shaft by the high-speed rotation of the shaft, an intake flow is generated in the piercing hole and chips are smoothly discharged. Also, it becomes possible to supply a gas, such as air, liquid, such as water and alcohol, and mist, etc., through the piercing hole, and hence not only chips are efficiently discharged but also the drilled portion can be cooled down.

The eighth embodiment of the present invention provides a drilling tool according to the fifth embodiment, wherein the spiral groove part is provided so as to generate air flow from a rear end of the shaft to a tip side of the shaft along the groove part by the rotation of the tool due to obliquity of the spiral groove part extending towards a rear side of a rotation direction and towards a tip side of the shaft, and a hole which penetrates though the shaft to reach the tip of the bit is formed so that a vicinity of the bit communicates with air present at a rear end side of the shaft.

According to the above embodiment of the invention, since intake flow is generated between the inner wall of the hole and the shaft during a drilling operation while a discharge flow is generated through the piercing hole by the high-speed rotation, it becomes possible to carry out a drilling operation while discharging the chips through the piercing hole. Accordingly, the chips can be collected through the piercing hole, and it becomes possible to carry out a drilling operation without scattering the chips.

The ninth embodiment of the present invention provides a method for drilling a hole part in a brittle drilled matter from which powdery chips are generated by rotating and driving a drilling tool in which a bit is fixed to a tip of a shaft, the method including the step of: performing a drilling process while generating air flow which flows from a vicinity of the bit to air present at a rear end side of the shaft by utilizing a rotation of the drilling tool.

According to the above embodiment of the invention, since the rotation of the bit forms a hole in a drilled matter and air flow is thereby generated in the hole, it becomes possible to supply liquid, such as water, to a drilled portion from outside of the hole or to discharge powdery chips to the outside of the hole part by using the air flow.

The tenth embodiment of the present invention provides a method for drilling according to the ninth embodiment, wherein the air flow generated by utilizing the rotation of the drilling tool is a discharge flow which flows from a tip side to a rear end side along an outside of the drilling tool.

According to the above embodiment of the invention, since the discharge flow is generated during the drilling operation, it becomes possible to discharge the chips to the outside of the hole part from the drilling portion by using the discharge flow. Accordingly, it becomes possible to prevent the chips to remain at the drilling portion, which may make the drilling operation impossible, and to carry out a smooth drilling operation.

The eleventh embodiment of the present invention provides a method for drilling according to the ninth or tenth embodiment, further including the step of: generating another air flow which flows an opposite direction of the air flow generated by the rotation of the drilling tool, so as to flow through a hole which penetrates through a tip side to a rear end side of the drilling tool.

According to the above embodiment of the invention, since each of the air flow which is separated by the drilling tool is smoothly flows in the opposite direction at the inner periphery side and the outer periphery side of the drilling tool having the piercing hole, it becomes possible to more efficiently discharge the chips.

The twelfth embodiment of the present invention provides a method for drilling according to the ninth embodiment, wherein the air flow generated by utilizing the rotation of the drilling tool is an intake flow which flows from a tip side to a rear end side along an outside of the drilling tool, and further including the step of: generating another air flow which flows in an opposite direction of the intake flow so as to flow through a hole which penetrates through a tip side to a rear end side of the drilling tool.

According to the above embodiment of the invention, it becomes possible to discharge the chips from the drilling portion to the outside of the drilled matter via the piercing hole through which the discharge flow flows.

BRIEF DESCRIPTION OF DRAWINGS

FIG. 5 is a graph showing drilling performance of drilling tools according to the present invention in comparison with that of conventional drilling tools at various drilling depths.

BEST MODE FOR CARRYING OUT THE INVENTION

Hereinafter, embodiments of the present invention will be explained with reference to the accompanying drawings.

Figure 1:
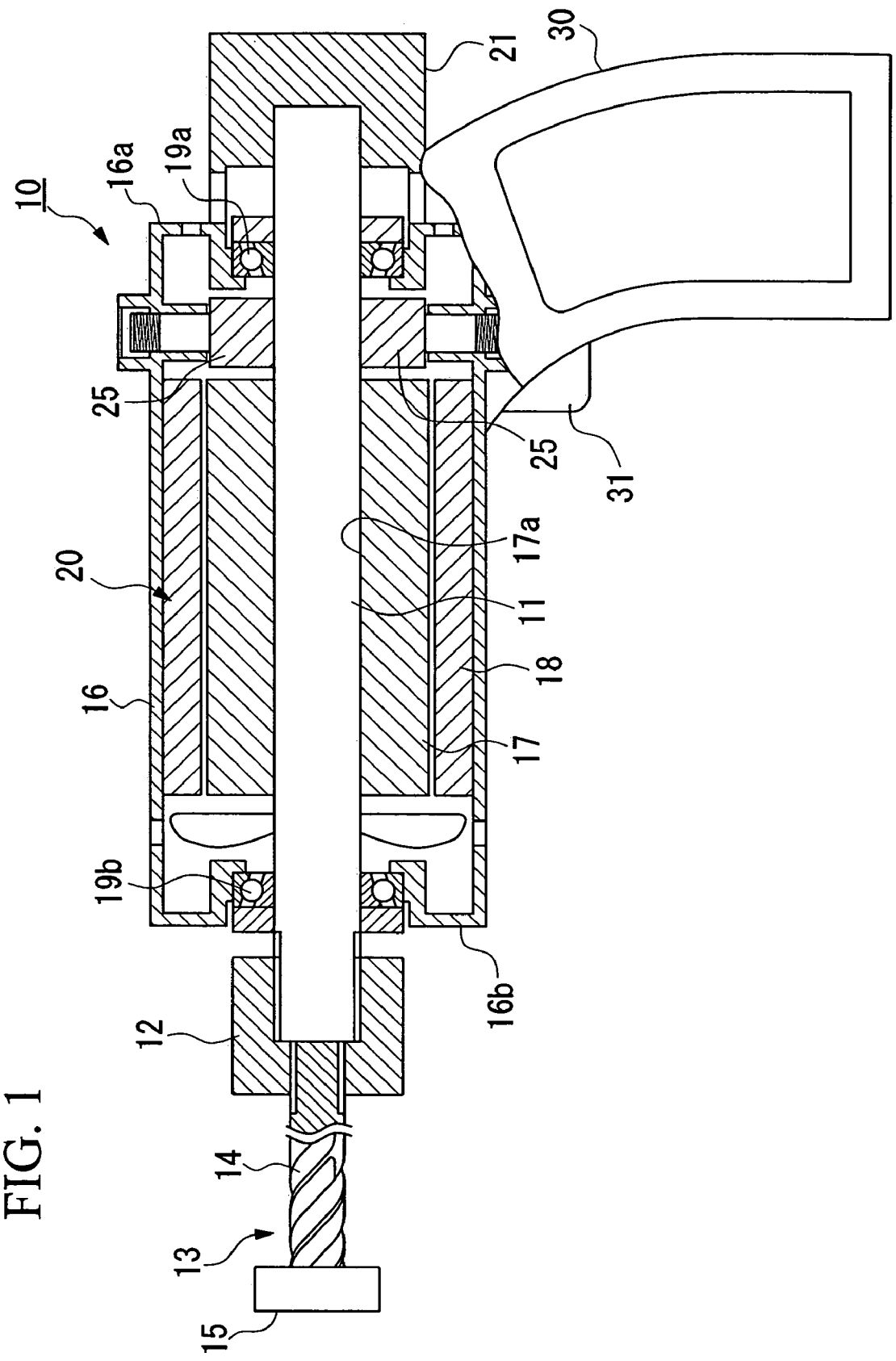
FIG. 1 is a diagram showing a side view of an entire drilling device according to an embodiment of the present invention.
Figure 2:
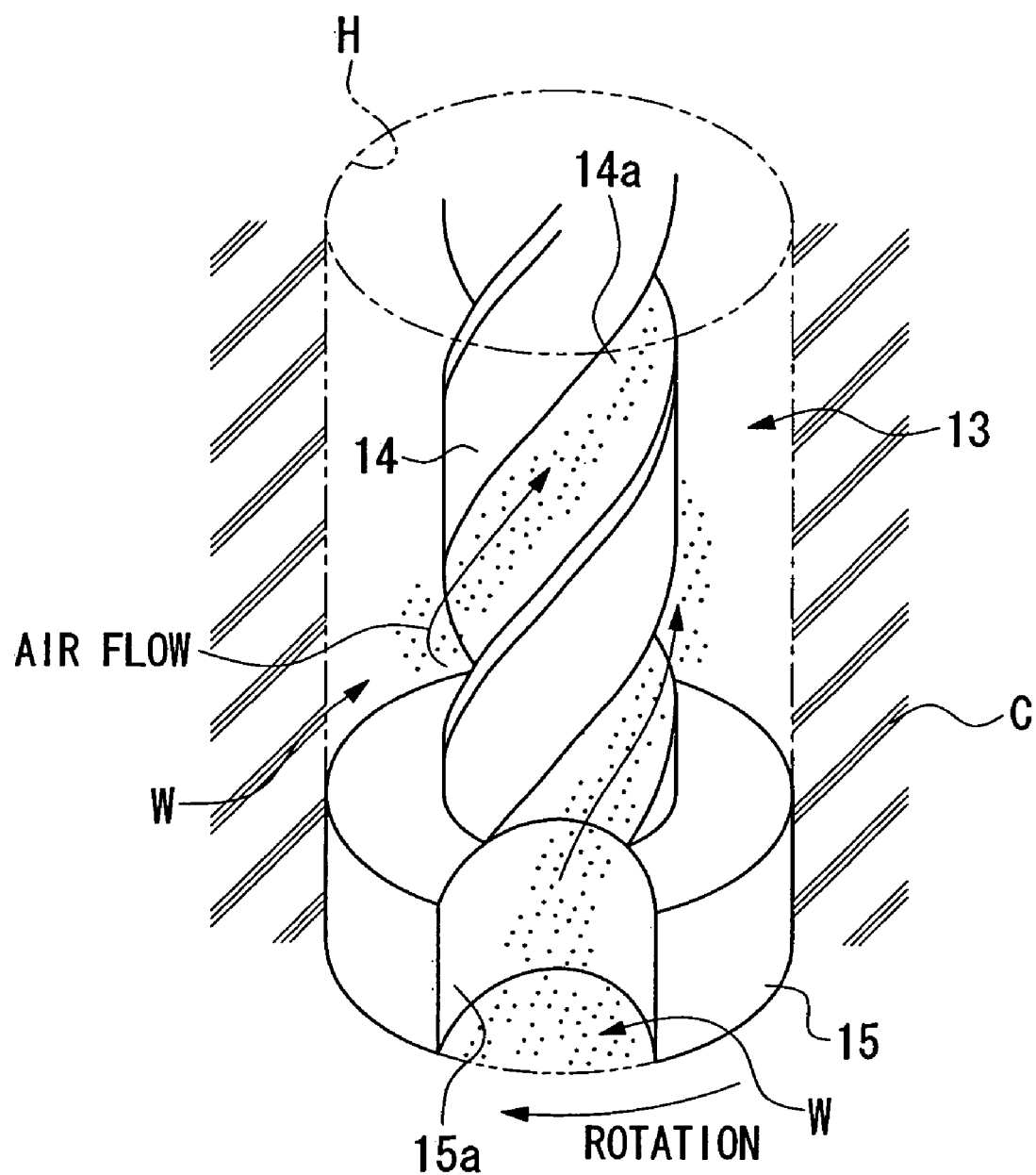
FIG. 2 is a diagram showing main parts of a drilling tool according to an embodiment of the present invention.

In FIGS. 1 and 2, the numeral 10 indicates a drilling device and the numeral 20 indicates a direct motor (a rotation-driving device) of the drilling device 10 which rotates and drives a drilling tool 13 that contacts a drilled matter C. The drilling device 10 is a handheld drill 10 that a user can hold by hand to perform a drilling operation, and includes a handle portion 30 which is fixed to a housing 16 having the direct motor 20 therein. The handheld drill 10 may be switching on and off by a trigger 31 disposed at the handle portion 30.

The direct motor 20 includes a cylindrical rotor 17 disposed in the housing 16 and a cylindrical stator 18 disposed around the rotor 17. A cylindrical rotary shaft 11 is press fitted into a penetration hole 17a which is formed at the center of the rotor 17. Both ends of the rotary shaft 11 are rotatably supported by bearings 19a and 19b which are disposed inside an upper wall portion 16a and a lower wall portion 16b, respectively, of the housing 16. That is, the bearings 19a and 19b support the vicinity of the upper and lower end portion, respectively, of the rotary shaft 11 which is inserted through the center of the rotor 17 so that they can receive force applied to the rotary shaft 11 and the rotor 17, through which the rotary shaft 11 is penetrated, in a thrust direction and in a radial direction. Also, an upper housing 21 which accommodates a rear end portion of the rotary shaft 11 is attached to a rear end portion of the housing 16.

The numeral 25 indicates a brush portion which is disposed in a circumferential direction so as to contact the rotary shaft 11 at an upper side of the diagram in the housing 16 of the direct motor 20. A driving current is supplied to the direct motor 20 from a power source (not shown in the diagram) which is incorporated in the handle portion 30 via the brush portion 25. Note that although a brush motor is used as the direct motor 20 according to this embodiment, it is possible to use a brushless motor instead.

The drilling tool 13 is detachably attached to an end portion of the rotary shaft 11 which is placed at the center of the direct motor 20, via an adaptor 12. The drilling tool 13 which is directly coupled with the rotary shaft 11 has a structure in which a bit 15 is fixed to an end portion of a shaft 14. Since a space is required between an inner wall of a hole part H and the shaft 14 in order to generate air flow, the shaft 14 is made of a rod type member having a smaller diameter than that of the bit 15, and a spiral groove part 14a is formed around an outer circumferential surface thereof. It is preferable to form the spiral groove part 14a in the same manner as a general twist drill in terms of the number and the angle of torsion, etc., since air flow can be efficiently generated.

Note that the drilling tool 13 shown in FIGS. 1 and 2 has the spiral groove part 14a which extends towards a rear end side when facing a rear side of the rotation direction, i.e., the winding direction of the right-hand thread, so that a discharge flow which flows from the vicinity of the bit 15 towards the rear end side along the shaft 14 can be generated when the drilling tool 13 is rotated in the right direction. On the other hand, if a spiral groove part which extends towards a rear end side when facing a front side of the rotation direction, i.e., the winding direction of the left-hand thread, is formed and the shaft is rotated in the right hand side direction, it becomes possible to generate an intake flow which flows towards an end portion side along the shaft.

The bit 15 may by a diamond bit in which diamond grains are bound using a metal bond, electrodeposition bond, a resin bond, etc., as a binder material, and is formed into a disc shape having a notch portion 15a as shown in FIG. 2. The shaft 14 and the bit 15 are fixed with their circumferential positions being matched as shown in FIG. 2 so that a trough portion of the spiral groove part 14a becomes continuous with the notch portion 15a in the axial direction.

Next, a drilling operation for a drilled matter C using the handheld drill 10 having the above configuration will be explained. Note that the handheld drill 10 is suitable for drilling a brittle matter, such as a concrete and a glass, from which powdery chips W will be generated by the operation of the bit 15.

First, the handheld drill 10 is set for the drilled matter C so that the axis of the rotary shaft 11 aligns with a predetermined position of the drilled matter C where a hole is to be formed. Then, the trigger 31 is activated to supply electricity to a coil of the rotor 17 (or the stator 18) via the brush portion 25 of the direct motor 20 so that the rotor 17 is rotated at a high speed. While the rotor 17 is rotated at a high speed, the handheld drill 10 is moved forward in the axial direction of the rotary shaft 11 to make the bit 15 contact with the surface of the drilled matter C at a predetermined pressure. In this manner, the face of the tip of the bit 15 drills the drilled matter C while producing powdery chips W, and a hole part H of a size corresponding to the size of the bit 15 is formed in the drilled matter C.

When the handheld drill 10 is further moved forward and the shaft 14 of the drilled tool 13 enters inside the cylindrical hole part H, air between the inside wall of the hole part H and the shaft 14 is moved in a direction indicated by arrows in FIG. 2 due to the high-speed rotation of the spiral groove part 14a, and a strong discharge flow in a backward direction along the shaft 14 is generated.

The powdery chips W are forcibly and smoothly caused to flow in a backward direction by the discharge flow generated and are eventually discharged outside the hole part H. At that time, if the shaft 14 is rotated at a peripheral velocity of 250 m/min or greater, preferably of 400 m/min, air flow having sufficient speed for discharging the chips W can be generated.

Also, the pressure inside the hole part H becomes negative by the generation of the strong discharge flow, and the drilling tool 13 (the handheld drill 10) is pulled towards the forward direction.

As explained above, by fixing the bit 15 which drills the drilled matter C to the tip of the shaft 14 having the spiral groove part 14a at the outer circumferential surface thereof to form the drilling tool 13 and by rotating the drilling tool 13 at a high speed to drill the drilled matter C, it becomes possible to generate air flow in the hole part H, which is strong enough to discharge the chips W. By adopting this configuration, not only use of an air (or water) supply device for discharging the chips W, which is conventionally required for the drilled device described above, becomes unnecessary but also it becomes possible to surely and efficiently discharge the chip W even for a deep hole of a small diameter which cannot be formed by using a conventional air supply device as the chips W cannot be discharged.

That is, it becomes possible to drill a hole by surely discharging the chips W inside the hole part H which prevents the drilling operation, it be comes possible to form a deeper hole part H.

Figure 3:
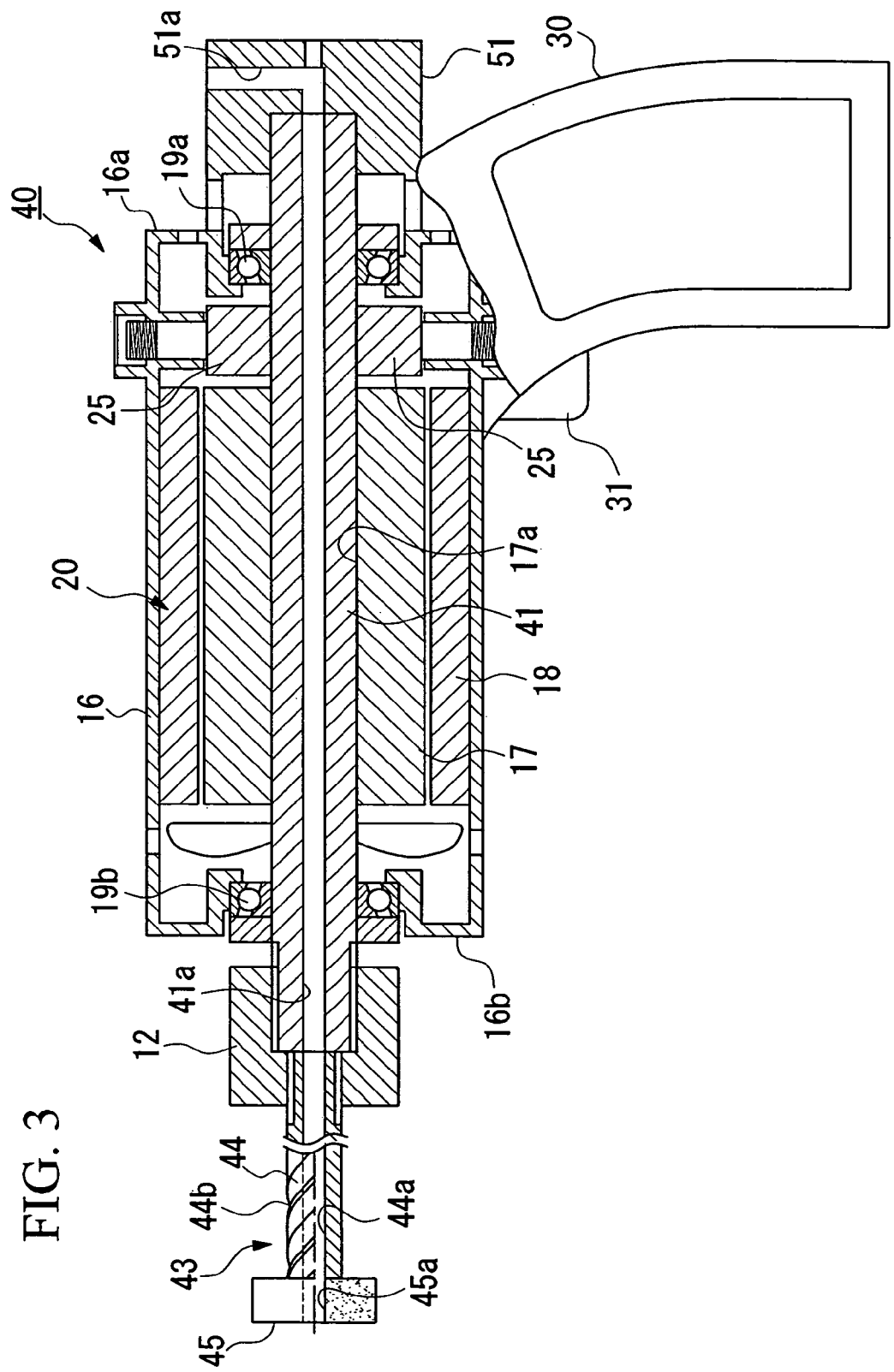
FIG. 3 is a diagram showing a side view of an entire drilling device according to another embodiment of the present invention.

FIG. 3 is a diagram showing another embodiment of the present invention. Note that parts that are the same as those shown in FIG. 1 are indicated using the same numeral and the explanation thereof is omitted.

In FIG. 3, the numeral 40 indicates a drilling device which is capable of drilling a drilled matter by rotating a drilling tool 43. The drilling tool 43 has a configuration in which a bit 45 is fixed to the tip of a shaft 44 on which a groove part 44b is formed, and holes 44a and 45a which penetrate in an axial direction are formed in the shaft 44 and the bit 45, respectively.

The drilling tool 40 is fixed to the rotary shaft 41, and holes 41a and 51a which communicate with the holes 44a and 45a, are formed in the rotary shaft 41 and an upper housing 51 which accommodates a rear end portion of the rotary shaft 41a, respectively. That is, the vicinity of a drilled part of a drilled matter is made to communicate with the outside by the holes 44a, 45a, 41a, and 51a. Note that it is not necessary to form the hole 45 of the bit 45 if a notch portion which extends to the hole 44a of the shaft 44 is formed with the bit 45.

When a drilling operation is carried out by rotating the drilling tool 40, a discharge flow is generated along the shaft 44 to discharge chips and an intake flow from the outside to the drilled portion is generated via the holes 44a, 45a, 41a, and 51a, if a spiral groove part extending in a rear end side with respect to a rear side of the rotation direction is formed with the shaft 44. That is, the discharge flow and the intake flow are separated by the shaft 43 due to the presence of the holes 44a and 45a, and it becomes possible to more smoothly discharge the chips.

Also, it is possible to forcibly supply a gas, liquid, mist, etc., to the drilled part using an external device through the holes 44a, 45a, 41a, and 51a. In this manner, not only does a smoother discharging of chips and drilling operation become possible, but also the drilled part of a drilled matter and the bit 45 may be cooled down by supplying water, alcohol, and so on.

Moreover, an intake flow is generated along the shaft 44 if the groove part is formed in a spiral shape extending in the rear end side with respect to the front side of the rotary direction of the shaft 44, and a discharge flow corresponding to the intake flow is generated from the drilled part to the outside through the holes 44a, 45a, 41a, and 51a. Since powdery chips generated at the drilled part are discharged to the outside through each of the holes by the discharge flow, it becomes possible to prevent contamination of the work area by the chips by recovering the chips from the holes. Furthermore, it becomes possible to readily carry out an operation in which the chips are recovered to confirm the state of the drilled matter.

EMBODIMENTS

Figure 4:
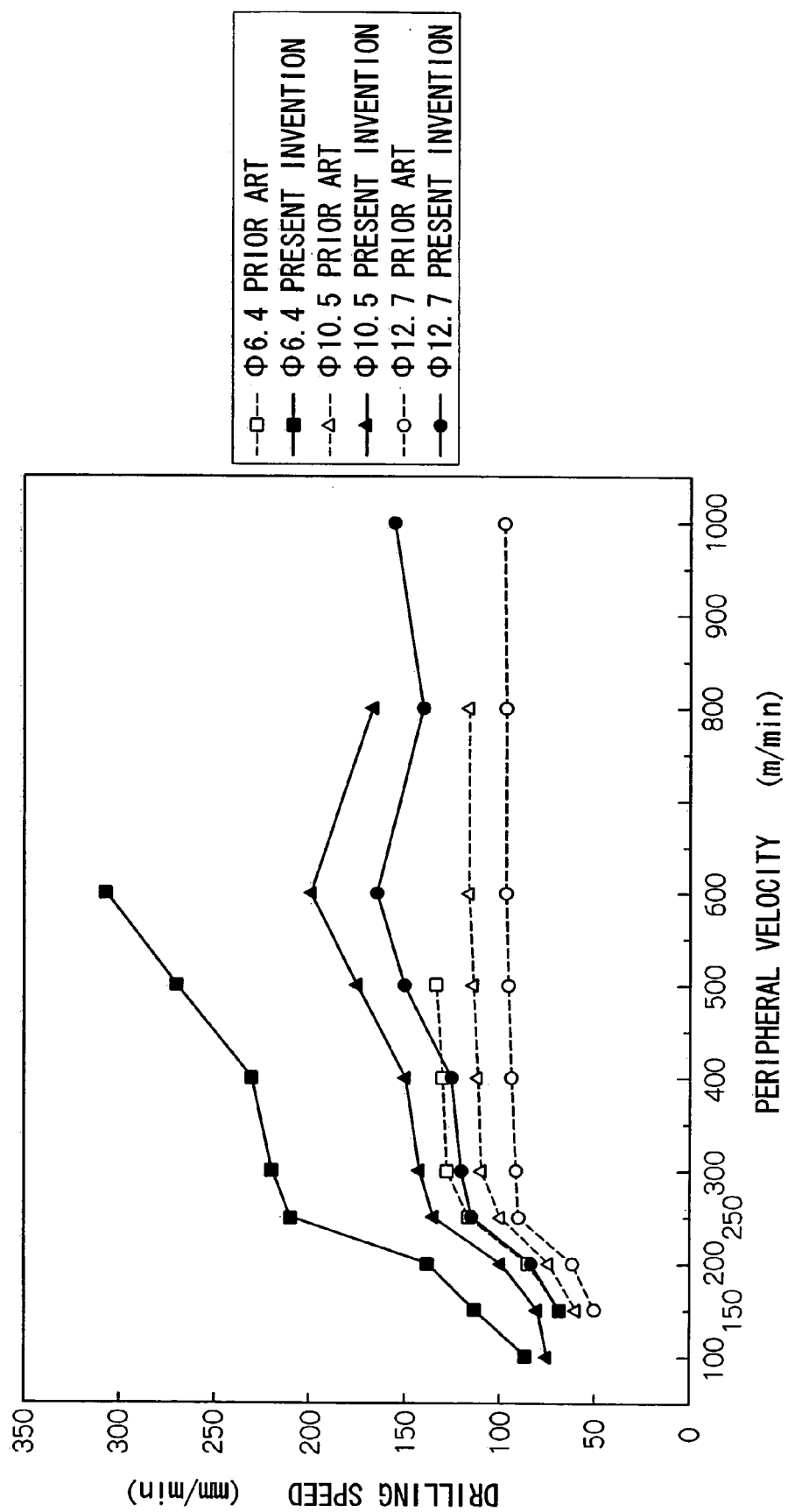
FIG. 4 is a graph showing drilling performance of drilling tools having various bit diameter according to the present invention in comparison with that of conventional drilling tools.

As shown in FIGS. 4 and 5, experiments were conducted to compare the drilling performance of drilling tools according to the present invention (one which discharges through the circumference of the shaft) with that of conventional drilling tools (non-core type). The drilling conditions used for the comparison were as follows.

Drilled matter: plain concrete block
Drilling type: dry drilling
Bit diameter: three types ($\phi 6.4$ mm, $\phi 10.5$ mm, and $\phi 12.7$ mm) for each of the conventional tools and the tools of the present invention FIG. 4 is a graph showing the drilling speed of each tool when a drilling operation was carried out using different peripheral velocity. The drilling speed was calculated by measuring the time which was required to make a hole of 50 mm depth by each tool, and indicated by the distance at which each of the tools could move in a forward direction per one minute. Accordingly, as the figures of the drilling speed becomes larger, the better the performance of the tool.

From FIG. 4, it is clear that the drilling speed of the present invention is faster than the conventional tool of the same diameter in any diameter range, and even a tool of $\phi 12.7$ mm diameter of the present invention whose drilling speed is the slowest among the tools of the prevent invention can drill at a speed at least equal to that of the conventional tool.

Also, the reason that the difference between the tools of the present invention and the conventional tools becomes larger as the bit diameter becomes smaller is that it becomes difficult to discharge powdery chips as the diameter of the hole becomes smaller, and hence the discharge effect of the present invention using the discharge flow becomes apparent. As for the hole of 50 mm depth and φ12.7 mm diameter, it is considered that chips were easily removed even when the conventional tool was used.

Note that the conventional tool of φ6.4 mm diameter could not drill as the bit thereof fell at the peripheral velocity of 550 m/min. The reason of this is considered to be the increase in the rotation resistance caused by chips which were not removed from the hole.

FIG. 5 is a graph showing the differences in the drilling speed at different drilling depths when the tools of present invention and prior art having the bit diameter of φ6.4 mm were used at peripheral velocity of 250 m/min and 500 m/min.

From FIG. 5, it is clear that the drilling speed was significantly reduced in the conventional tool when the drilling depth exceeded 15 mm while no significant change was observed for the tool of the present invention, although there was tendency in both tools for the drilling speed to become slower as the drilling depth increased.

That is, it becomes difficult to advance the conventional tool as chips are hardly removed from the hole as the depth of the hole increases while the tool of the present invention can be advanced even when a deep hole is formed because chips are surely removed from the hole regardless of the depth of the hole.

Note that the shape, combinations, etc., of each structural member shown in the above embodiments are mere examples, and variations, and modifications can be made based on design requirements, etc., within the scope and sprit of the present invention. For example, only one notch portion 15a is formed with the bit 15 (45) in the diagrams; however, it is possible to form two or more of the notch portions in accordance with the number of the groove parts 14a of the shaft 14 as long as it does not decrease the strength of the bit 15, the drilling performance, and so forth.

In addition, although the drilling device is a handheld drill which a user can hold by hand to perform a drilling operation, it is possible, of course to provide a base for fixing a drilled matter, and carry out a drilling operation in a fixed state of the drilled matter.

INDUSTRIAL APPLICABILITY

As explained above, according to the drilling device of the first embodiment of the present invention, it becomes possible to readily carry out a discharging or collecting operation of the chips, a supplying operation of a fluid used for drilling, etc., without providing a special device or mechanism for discharging or collecting the chips.

According to the drilling device of the second embodiment of the present invention, since powdery chips present in the hole part are discharged outside of the hole by the discharge flow generated by the shaft rotated at a high-speed, the chips do not remain at a drilled portion to prevent the drilling operation, and a deep hole of small diameter, which is difficult to form using a conventional technique, can be readily formed. Also, since the chips are immediately discharged from the drilled portion as the drilling operation proceeds, a special device which supplies a fluid to a drilled portion to discharge the chips or a structure for supplying a fluid to a drilled portion becomes unnecessary, and a simplified and labor saving drilling device may be realized.

According to the drilling device of the third embodiment of the present invention, since air flow is generated along the outer periphery side of the tool and in the piercing hole so as to flow in the opposite directions, it becomes possible to more smoothly carry out a discharging and collecting operation of the chips and a supplying of fluid.

According to the drilling device of the fourth embodiment of the present invention, since air flow is generated along the outer periphery side of the tool and in the piercing hole so as to flow in the opposite directions, it becomes possible to readily collect the chips via the piercing hole without scattering the chips, and a drilling operation which does not contaminate the surrounding environment becomes possible.

According to the drilling tool of the fifth embodiment of the present invention, it becomes possible to readily carry out a discharging or collecting operation of the chips, supplying of a fluid for the drilling operation, etc., by using the air flow generated during the drilling operation without using a device or mechanism for discharging or collecting chips.

According to the drilling tool of the sixth embodiment of the present invention, since the powdery chips present in the hole may be discharged outside as the drilling operation proceeds, and hence the chips do not remain at a drilled portion to prevent the drilling operation, a deep hole of small diameter, which is difficult to form using a conventional technique, can be readily formed.

According to the drilling tool of the seventh embodiment of the present invention, since air flow which flows along the outer periphery of the tool and air flow which flows through the piercing hole are generated so as to flow in the opposite directions, it becomes possible to perform a drilling operation while smoothly generating the discharge and intake flows.

According to the drilling tool of the eighth embodiment of the present invention, since air flow which flows along the outer periphery of the tool and air flow which flows through the piercing hole are generated so as to smoothly flow in the opposite directions, it becomes possible to readily collect the chips through the piercing hole without scattering the chips, and hence, a drilling operation may be carried out Without contaminating the operating environment.

According to the drilling method of the ninth embodiment of the present invention, it becomes possible, for example, to readily discharge the powdery chips to the outside of the hole part, and to supply liquid, such as water, to the drilling portion from the outside of the hole by using the air flow which is generated in association with the drilling operation.

According to the drilling method of the tenth embodiment of the present invention, it becomes possible to readily discharge the chips to the outside of the hole from the drilling portion by using the discharge flow which is generated during the drilling operation. Accordingly, it becomes possible to prevent the chips to remain at the drilling portion, which may make the drilling operation impossible, and to readily form a deep hole of small diameter.

According to the drilling method of the eleventh embodiment of the present invention, since each of the air flow which is separated by the drilling tool is smoothly flows in the opposite directions at the inner periphery side and the outer periphery side of the drilling tool having the piercing hole, it becomes possible to smoothly form a deep hole of small diameter.

According to the drilling method of the twelfth embodiment of the present invention, since the chips can be discharged to the outside of the drilled matter from the drilling portion via the piercing hole through which the discharge flow flows, it becomes possible, for example, to collect the chips without scattering them by connecting a means for collecting the chips to the piercing hole.

What is claimed is:

1. A drilling device for forming a hole in a brittle drilled matter from which powdery chips are generated, comprising:
   a tool which includes a shaft and a disc shape bit having a diameter of 3–15 mm and fixed to an end portion of said shaft; and
   a rotation driving device which rotates and drives said shaft at a peripheral velocity of 250 m/mm or more,
   wherein said bit has a larger diameter than said shaft and has a notch portion, and
   a spiral groove part which extends to a tip of said bit is formed in an outer peripheral surface of said shaft of said tool.

2. A drilling device according to claim 1, wherein said spiral groove part is provided so as to generate air flow from a tip side of said shaft to a rear end side along said groove part by the rotation of said tool due to obliquity of said spiral groove part extending towards a rear end side of said shaft.

3. A drilling device according to claim 1, wherein a hole which penetrates through said shaft to reach the tip of said bit is formed in said tool so that a vicinity of said bit communicates with air present at a rear end side of a said shaft.

4. A drilling device according to claim 1, wherein said spiral groove part is provided so as to generate air flow from a rear end of said tool to a tip side of said shaft along said groove part by the rotation of said tool due to obliquity of said spiral groove part extending towards a rear side of a rotation direction by said rotation driving device and towards a tip side of said shaft, and
   a hole which penetrates through said shaft to reach the tip of said bit is formed in said tool so that the tip side of said bit communicates with air present at a rear end side of said shaft.

5. A drilling device according to claim 1, wherein said bit is a diamond bit in which diamond grains are bound using binder material.

6. A drilling device according to claim 1, wherein said shaft and said bit are fixed with their circumferential positions being matched so that a through portion of said spiral groove part becomes continuous with said notch portion in the axial direction.

7. A drilling tool for forming a hole in a brittle drilled matter from which powdery chips are generated, comprising:
   a shaft rotated at a peripheral velocity of 250 m/mm or more; and
   a disc shape bit having a diameter of 3–15 mm fixed to an end portion of said
   wherein said bit has a larger diameter than said shaft and has a notch portion, and
   a spiral groove part which extends to a tip of said bit is formed in an outer peripheral surface of said shaft.

8. A drilling tool according to claim 7, wherein said spiral groove part is provided so as to generate air flow from a tip side of said shaft to a rear end side along said groove part by the rotation of said tool due to obliquity of said spiral groove part extending towards a rear side of a rotation direction and towards a rear end side of said shaft.

9. A drilling tool according to claim 7, wherein a hole which penetrate through said bit is formed so that a vicinity of said bit communicates with air present at a rear end side of said shaft.

10. A drilling tool according to claim 7, wherein said spiral groove part is provided so as to generate air flow from a rear end of said shaft to a tip of said shaft along said groove part by the rotation of said tool due to obliquity of said spiral groove part extending towards a rear side of a rotation direction and towards a tip side of said shaft, and
    a hole which penetrates through said shaft to reach the tip of said bit is formed so that a vicinity of said bit communicates with air present at a rear end side of said shaft.

11. A drilling tool according to claim 7, wherein said bit is a diamond bit in which diamond grains are bound using a binder material.

12. A drilling tool according to claim 7, wherein said shaft and said bit are fixed with their circumferential positions being matched so that a through portion of said spiral groove part becomes continuous with said notch portion in the axial direction.

13. A method for drilling a hole in a brittle drilled matter from which powdery chips are generated by rotating and driving a drilling tool in which a bit having a diameter of 3–15 mm is fixed to a tip of a shaft having a spiral groove part which extends to a tip of said bit in an outer peripheral surface thereof said method comprising the steps of:
    rotating said shaft at a peripheral velocity of 250 m/mm or more and performing a drilling process while generating air flow which flows from a vicinity of said bit to a rear end side of said shaft by utilizing a rotation of said shaft.

14. A method for drilling according to claim 13, wherein said air flow generated by utilizing the rotation of said drilling tool is a discharge flow which flows from a tip side to a rear end side along an outside of said drilling tool.

15. A method for drilling according to claim 13, further comprising the step of generating another air flow which flows in an opposite direction of said air flow generated by the rotation of said drilling tool, so as to flow through a hole which penetrates through a tip side to a rear end side of said drilling tool.

16. A method for drilling according to claim 13, wherein said air flow generated by utilizing the rotation of said drilling tool is an intake flow which flows from a tip side to a rear end side along an outside of said drilling tool, and further comprising the step of:
    generating another air flow which flows in an opposite direction of said intake flow so as to flow through a hole which penetrates through a tip side to a rear end side of said drilling tool.

17. A method for drilling according to claim 14, wherein a pressure inside said hole becomes negative.

* * * * *

UNITED STATES PATENT AND TRADEMARK OFFICE
CERTIFICATE OF CORRECTION

PATENT NO. : 7,131,795 B2  
APPLICATION NO. : 10/482534  
DATED : November 7, 2006  
INVENTOR(S) : Shigeru Mazaki et al.

It is certified that error appears in the above-identified patent and that said Letters Patent is hereby corrected as shown below:

In column 11, lines 16, in Claim 1, after "of" delete "250 m/mm" and insert --250 m/min--

In column 11, lines 56, in Claim 7, after "of" delete "250 m/mm" and insert --250 m/min--

In column 11, lines 59, in Claim 7, after "fixed to an" delete "end portion of said wherein said bit has" and insert --end portion of said shaft, wherein said bit has--

In column 12, lines 36, in Claim 13, after "of" delete "250 m/mm" and insert --250 m/min--

Signed and Sealed this

Fifteenth Day of July, 2008

JON W. DUDAS  
*Director of the United States Patent and Trademark Office*